US010528350B2

(12) United States Patent
Holm et al.

(10) Patent No.: US 10,528,350 B2
(45) Date of Patent: Jan. 7, 2020

(54) SHARED RESOURCES IN A DATA PROCESSING APPARATUS FOR EXECUTING A PLURALITY OF THREADS

(71) Applicant: ARM LIMITED, Cambridge (GB)

(72) Inventors: Rune Holm, Cambridge (GB); David Hennah Mansell, Norwich (GB)

(73) Assignee: ARM Limited, Cambridge (GB)

( * ) Notice: Subject to any disclaimer, the term of this patent is extended or adjusted under 35 U.S.C. 154(b) by 136 days.

(21) Appl. No.: 15/505,714

(22) PCT Filed: Jul. 28, 2015

(86) PCT No.: PCT/GB2015/052177
§ 371 (c)(1),
(2) Date: Feb. 22, 2017

(87) PCT Pub. No.: WO2016/038328
PCT Pub. Date: Mar. 17, 2016

(65) Prior Publication Data
US 2017/0286107 A1   Oct. 5, 2017

(30) Foreign Application Priority Data

Sep. 8, 2014  (GB) .................................. 1415834.9

(51) Int. Cl.
*G06F 9/30* (2018.01)
*G06F 9/52* (2006.01)

(52) U.S. Cl.
CPC ............ *G06F 9/3009* (2013.01); *G06F 9/526* (2013.01); *G06F 9/524* (2013.01)

(58) Field of Classification Search
CPC ......... G06F 9/3009; G06F 9/526; G06F 9/524
See application file for complete search history.

(56) References Cited

U.S. PATENT DOCUMENTS

| 7,015,913 | B1 * | 3/2006 | Lindholm | ............. | G06F 9/3851 |
| | | | | | 345/501 |
| 7,496,918 | B1 | 2/2009 | Dice et al. | | |
| 7,765,547 | B2 | 7/2010 | Cismas et al. | | |
| 2007/0124545 | A1 | 5/2007 | Blanchard et al. | | |

(Continued)

FOREIGN PATENT DOCUMENTS

| EP | 0 783 152 | 7/1997 |
| JP | 2009-230757 | 10/2009 |

(Continued)

OTHER PUBLICATIONS

International Search Report and Written Opinion of the ISA for PCT/GB2015/052177, dated Oct. 27, 2015, 9 pages.

(Continued)

*Primary Examiner* — Sisley N Kim
(74) *Attorney, Agent, or Firm* — Nixon & Vanderhye P.C.

(57) ABSTRACT

A data processing apparatus (100) executes threads and includes a general program counter (PC) (120) identifying an instruction to be executed for at least a subset of the threads. Each thread has a thread PC (184). The subset of threads has at least one lock parameter (188, 500-504) for tracking exclusive access to shared resources. In response to a first instruction executed for a thread, the processor (160) modifies the at least one lock parameter (188), (500-504) to indicate that the thread has gained exclusive access to the shared resource. In response to a second instruction, the processor modifies the at least one lock parameter (188, 500-504) to indicate that the thread no longer has exclusive access. A selector (110) selects one of the subset of threads based on the at least one lock parameter (188, 500-504) and sets the general PC (120) to the thread PC (184) of the selected thread.

27 Claims, 8 Drawing Sheets

(56) References Cited

U.S. PATENT DOCUMENTS

| | | | |
|---|---|---|---|
| 2008/0270732 A1* | 10/2008 | Cai | G06F 9/5016 711/173 |
| 2009/0144519 A1* | 6/2009 | Codrescu | G06F 9/526 711/207 |
| 2010/0031269 A1 | 2/2010 | Fontenot et al. | |
| 2011/0154368 A1* | 6/2011 | Banks | G06F 9/526 719/316 |
| 2012/0054394 A1* | 3/2012 | Namjoshi | G06F 9/526 710/200 |
| 2014/0075165 A1 | 3/2014 | Chen | |
| 2014/0189260 A1 | 7/2014 | Wang et al. | |
| 2014/0281196 A1* | 9/2014 | Dixon | G06F 12/14 711/105 |

FOREIGN PATENT DOCUMENTS

| | | |
|---|---|---|
| JP | 2011-505647 | 2/2011 |
| RU | 2233470 | 7/2004 |
| WO | WO 2006/058242 | 6/2006 |

OTHER PUBLICATIONS

Search Report for GB1415834.9, dated Mar. 10, 2015, 4 pages.
Singapore Written Opinion dated Sep. 26, 2017 in SG Application 11201701158X, 9 pages.
European Office Action dated Apr. 30, 2018 in EP Application No. 15744324.3, 7 pages.
G.T. Byrd et al, "Multithreaded Processor Architectures" *IEEE Spectrum*, vol. 32, No. 8, Aug. 1995, pp. 38-46.
Office Action for JP Patent Application No. 2017-512043 dated Apr. 16, 2019 and English translation, 5 pages.
Office Action dated Feb. 11, 2019 in IL Application No. 250301 (no English translation available), 8 pages.
Decision to Grant with Search Report dated Feb. 7, 2019 in RU Application 2017110464, 2 pages.

* cited by examiner

|   |                  | T#0 | T#1  | T#2 | T#3 | T#4 | T#5 | T#6 | ... | T#31 |
|---|------------------|-----|------|-----|-----|-----|-----|-----|-----|------|
| 0 | adds r0, r5, r3  | 15 + 56 | 21 + 68 | 0 + 0 | 2 + 98 | -1 + 1 | 5 + 563 | 997 + 7 | ... | 32 + 6 |
| 1 | beq label        | N   | N    | Y   | N   | Y   | N   | N   | ... | N    |
| 2 | mul r6, r0, r4   | 35 * 235 | 45 * 2342 |   | 806 * 98 |   | 67 * 43 | 456 * 53 | ... | 674 * 23 |
| 3 | label:           |     |      |     |     |     |     |     |     |      |
| 4 | ldr r8, [r9]     | 100 | 104  | 108 | 208 | 20c | 200 | 300 | ... | 304  |

FIG. 2

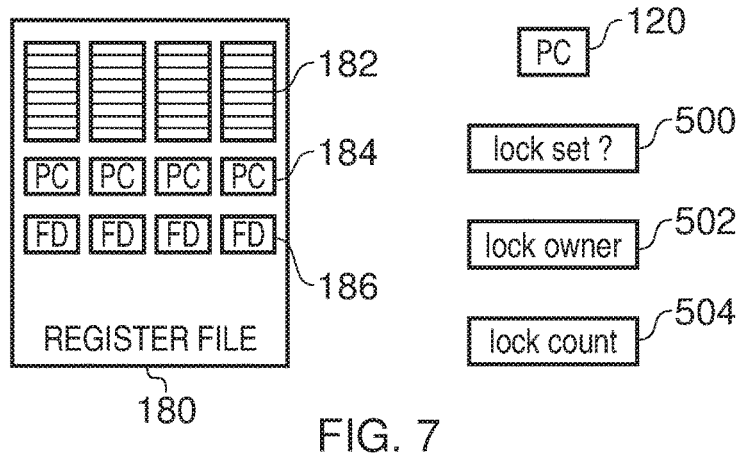

FIG. 7

```
0       locking_sequence_start:
1       inc_lock_count
2       retry_lock:
3       mov w1, #1
4       ldaxr w0, [x19]
5       cmp w0, #0
6       bne backoff_lock
7       stxr w2, w1, [x19]
8       cbnz w2, retry_lock
9       br lock_acquired 10      backoff_lock:
11      dec_lock_count
        #decrease the lock count, in case another thread in the
        subset of threads wants a different lock and could proceed ...# wait a while, in the hope that the lock holding thread will finish
and release the lock 12      br locking_sequence_start
        #restart the full locking sequence, including increasing lock count 13      lock_acquired ...#do something with the locked data 14      release_lock:
15      mov w1, #0
16      str w1, [x19]
17      dec_lock_count
```

FIG. 8

SHARED RESOURCES IN A DATA PROCESSING APPARATUS FOR EXECUTING A PLURALITY OF THREADS

This application is the U.S. national phase of International Application No. PCT/GB2015/052177 filed 28 Jul. 2015, which designated the U.S. and claims priority to GB Patent Application No. 1415834.9 filed 8 Sep. 2014, the entire contents of each of which are hereby incorporated by reference.

The present technique is concerned with the field of data processing. In particular, the present technique considers an apparatus and method of data processing in which a plurality of threads execute.

A data processing apparatus may execute a plurality of threads. The threads may progress in lockstep. In particular, each thread may maintain its own program counter. The system itself may maintain its own general program counter such that the instruction referred to by the general program counter is executed for threads whose program counters match the general program counter. This type of system may be known as a Single Instruction Multiple Thread (SIMT) system, for example. At each step, therefore, a single instruction is executed for at least a subset of the plurality of threads. Once an instruction has been executed for the subset of threads, the general program counter may be changed to refer to a new instruction. It may be preferable in such systems to set the general program counter to match the smallest of the program counters maintained by each of the threads. In this manner, the thread that is furthest behind can be allowed to make progress and thereby catch up to threads that have higher program counters. This may cause threads to come into convergence, i.e. to share the same program counter value such that a single instruction may be executed on as many of the threads as possible.

A modification to this scheme involves tracking the function call depth of each thread. In particular whenever a thread makes a function call, a function call depth counter for that thread is incremented and whenever the thread returns from a function call, the function call depth counter for that thread is decremented. When the general program counter is to change, it is set to match the program counter of a thread first having the highest function call depth counter and secondly (if there are multiple such threads) the thread or threads from that set having the lowest program counter value. In other words, the program counter value is only considered amongst all threads having the highest function call depth. Accordingly, this helps to prevent a performance problem or deadlock situation which could happen if only the program counter values were considered. When a subset of the threads make a function call, this may cause the program counters associated with those threads to dramatically increase, so that the instructions which should be executed next from the function itself do not have the lowest program counter values. By selecting threads for execution based on the function call depth, the function can be processed first even if it does not have the lowest program counter.

Both of the above two mechanisms are prone to suffering from deadlock where the code to be executed comprises a shared resource to which exclusive access is required. For example, a lock may be held by a single thread at any one instant, allowing that thread and only that thread access to the shared resource.

A thread that accesses the shared resource may have a higher program counter than the remaining threads that cannot access the shared resource. Consequently, the remaining threads will be able to execute, whilst the thread that has access to the shared resource will not. A deadlock will occur because the remaining threads will not be able to access the shared resource whilst another thread has access to it. However, the thread with access to the shared resource may never be allowed to execute. Accordingly, none of the threads makes any progress and the system halts.

In accordance with one aspect of the present technique there is provided a data processing apparatus configured to execute a plurality of threads, the data processing apparatus comprising: a general program counter for identifying one instruction in a stream of instructions to be executed for at least a subset of the plurality of threads, wherein each thread in the subset has an associated thread program counter for identifying one instruction in the stream of instructions, a selector configured to select a a selected thread of the subset of threads and to set the general program counter to the thread program counter associated with the selected thread; and a processor configured to execute an instruction identified by the general program counter for one or more of the subset of threads including the selected thread, wherein the subset of threads is associated with at least one lock parameter for tracking which of the subset of threads has exclusive access to a shared resource; wherein the processor is configured to modify the at least one lock parameter to indicate that a thread has gained exclusive access to the shared resource in response to a first instruction executed for that thread, and to modify the at least one lock parameter to indicate that the thread no longer has exclusive access to the shared resource in response to a second instruction executed for that thread; and wherein the selector is configured to select the selected thread based on the lock parameter associated with each thread.

In accordance with another aspect of the present technique, there is provided a data processing method for executing a stream of instructions for a subset of a plurality of threads, wherein each thread in the subset has an associated thread program counter for identifying one instruction in the stream of instructions, the data processing method comprising the steps:

selecting a selected thread of the subset of threads and setting a general program counter to the thread program counter associated with the selected thread, wherein the general program counter identifies one instruction in a stream of instructions to be executed for the subset of threads; and executing an instruction identified by the general program counter for one or more of the subset of threads including the selected thread, wherein the subset of threads is associated with at least one lock parameter for tracking which of the subset of threads has exclusive access to a shared resource;

wherein the at least one lock parameter is modified to indicate that a thread has gained exclusive access to the shared resource in response to a first instruction executed for that thread, and is modified to indicate that the thread no longer has exclusive access to the shared resource in response to a second instruction executed for that thread; and wherein the selector is configured to select the selected thread based on the at least one lock parameter.

In accordance with another aspect, there is provided a data processing apparatus configured to execute a plurality of threads, the data processing apparatus comprising:

a general program counter means for identifying one instruction in a stream of instructions to be executed for at least a subset of the plurality of threads, wherein each thread in the subset has an associated thread program counter means for identifying one instruction in the stream of instructions, a selection means for selecting a selected thread of the subset of threads and for setting the general program counter means to the thread program counter means associated with the selected thread; and a processor means for executing an instruction identified by the general program counter means for one or more of the subset of threads including the selected thread, wherein the subset of threads is associated with at least one lock parameter for tracking which of the subset of threads has exclusive access to a shared resource;

wherein the processor means is for modifying the at least one lock parameter to indicate that a thread has gained exclusive access to the shared resource in response to a first instruction executed for that thread, and for modifying the at least one lock parameter to indicate that the thread no longer has exclusive access to the shared resource in response to a second instruction executed for that thread; and wherein the selection means is for selecting the selected thread based on the at least one lock parameter.

Further aspects, features, advantages and example embodiments of the present technique will be described, by way of example only, with reference to the Figures in which:

FIG. 2 shows an example of the execution of a number of different threads having different program counter values;

FIG. 7 illustrates another example of state data maintained for a subset of threads;

FIG. 8 illustrates a third code example; and

Figure 1:
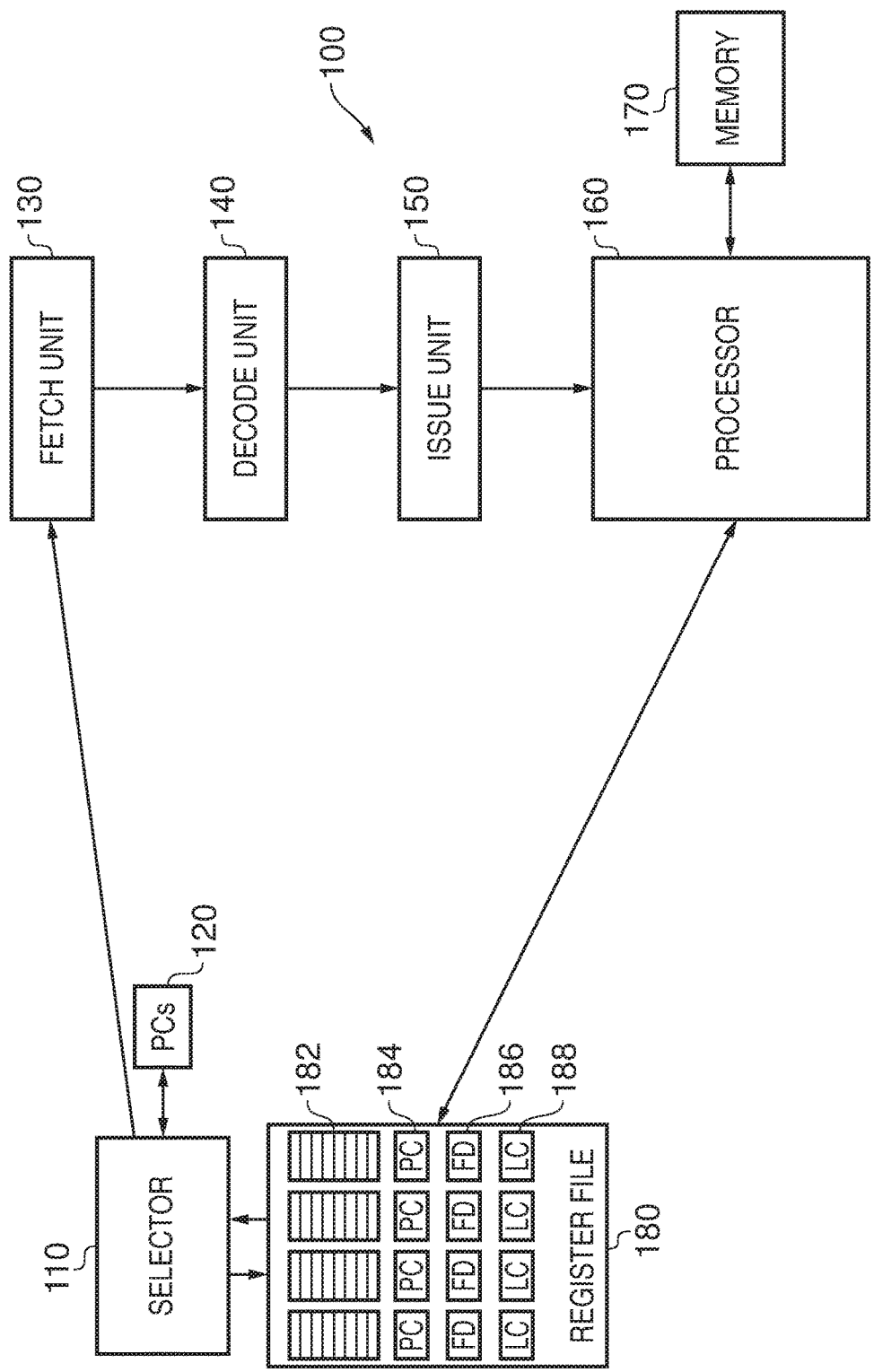
FIG. 1 shows a data processing apparatus in accordance with one embodiment.

In one example, a subset of threads has associated with it at least one lock parameter for tracking which thread of the subset has exclusive access to a shared resource. The processor may be responsive to a first instruction executed by a thread to modify the at least one lock parameter to thereby indicate that the thread has gained exclusive access to that shared resource. Similarly, the processor may be responsive to a second instruction to modify the at least one lock parameter to thereby indicate that the thread no longer has exclusive access to that shared resource. In selecting a selected thread, whose thread program counter is used as the value for the general program counter, and thereby determining which instruction to execute next for the subset of threads, the data processing apparatus may consider the at least one lock parameter. By selecting the value of the general program counter based on the lock parameter, it is possible to control which threads are able to execute at any particular instant and thereby reduce or prevent the chance of deadlock occurring.

For example, the first instruction may be executed when a thread gains or has gained exclusive access to a shared resource, and the second instruction may be executed when a thread relinquishes or has relinquished access to the shared resource.

The processor may be configured to grant exclusive access to a thread for the shared resource in response to a locking sequence comprising at least one locking instruction executed for that thread. A locking sequence may comprise a number of different instructions involving various comparisons, loads and stores. Within that sequence may be a locking instruction that finally sets the 'ownership' of a shared resource. In some examples, the locking instruction may cause the identity of the thread having exclusive access to the shared resource to be stored or recorded. In other examples, the locking instruction may merely set an indication that the resource has been locked, without explicitly identifying which thread has ownership of the lock. The locking sequence may in some cases not comprise the first instruction. In other words, the locking sequence, which causes a thread to gain exclusive access to the shared resource, may be separate from the first instruction, which indicates to the processor that the thread has gained exclusive access to the shared resource. The code may therefore comprise a locking sequence comprising the locking instruction, either preceded or followed by the first instruction. This approach may be useful to ensure backwards compatibility with legacy systems which do not support the first instruction. Even if the first instruction is not supported, the locking sequence may still be processed as normal by the legacy system. Some examples may execute the locking sequence before the first instruction, so that a thread first attempts to gain exclusive access to the shared resource, and then if successful the lock parameter is updated accordingly by executing the first instruction. Other examples may execute the first instruction before the locking sequence, so that effectively the first instruction is used to request a locking privilege for a thread before the lock is actually implemented using the locking sequence. In the second case, progression to the locking sequence may be dependent on the first instruction being successfully executed, which may depend on whether another thread already has the lock. In other embodiments, the locking sequence comprises the first instruction. In other words, the locking sequence grants exclusive access to a shared resource to one of the threads and also sets the lock parameter for that thread to indicate that the thread has exclusive access to the shared resource. Hence, there are different ways of implementing the locking sequence and first instruction.

Similarly, the processor may be configured to relinquish exclusive access to the thread for the shared resource in response to an unlocking sequence comprising at least one unlocking instruction executed for that thread. The unlocking sequence may comprise a number of different instructions, including comparisons, loads, or stores for example, that cause a particular thread to lose exclusive access to a shared resource. Exclusive access to a resource may be relinquished by removing a lock for a resource, or by passing the exclusive access to a different thread for example. Within the unlocking sequence may be an unlocking instruction, which is used to clear which thread has exclusive access to a shared resource or to indicate that a particular thread no longer has access to a shared resource. In other words, the unlocking instruction may be used to set or clear a variable to indicate that a particular thread no longer has exclusive access to a shared resource. In some embodiments, the unlocking sequence does not comprise the second instruction. In other words, the unlocking sequence does not modify the lock parameter associated with a thread to indicate that the thread no longer has exclusive access to that shared resource. Accordingly, there is a separation between the instruction or instructions in the code that perform the unlocking and the instruction in the code that sets the lock parameter to indicate that thread no longer has access to the shared resource. This is useful for backward compatibility reasons as discussed above. The second instruction may be executed after the unlocking sequence. In other embodiments, the unlocking sequence does comprise the second instruction.

The selector may be configured to select, as the selected thread, a first thread indicated by the at least one lock parameter as having exclusive access to the shared resource in preference to a second thread indicated by the at least one lock parameter as not having exclusive access to the shared resource. In other words, the selector may be configured such that a thread having exclusive access to the shared resource is prioritised. That thread may therefore be able to complete its use of the shared resource in order to unlock the shared resource. This helps to prevent deadlock, since the first thread, which has the capability to unlock the shared resource, is permitted to execute and thereby unlock the shared resource.

The selector may be configured to select the selected thread based on a function call depth parameter associated with each thread in the subset of threads. In other words, the selector may consider both the function depth call parameter and the at least one lock parameter, when determining which thread's thread program counter should be used to set the general program counter.

The selector may be configured to select the selected thread based on the thread program counter associated with each thread of the subset of threads. In other words, the selector may consider both the thread program counter and the at least one lock parameter when deciding which thread program counter to set to the general program counter.

The selection of the selected thread may be carried out in different ways. In some examples, a thread may be selected directly, and then the thread program counter of that thread may be used for the general program counter. In other examples, a specific thread program counter may be selected using a given program counter selection algorithm (implicitly selecting the corresponding thread as the selected thread). Hence, in general the references to selecting a selected thread in this application are intended to encompass selecting a thread program counter associated with a thread.

The lock parameter may take a number of different forms. In one example, each thread within the subset may have a corresponding lock parameter. When a thread which gains exclusive access to the shared resource executes the first instruction, the lock parameter for that thread can be modified to indicate that the thread has gained exclusive access to the resource. Similarly, when the thread relinquishes exclusive access to the thread, the corresponding lock parameter may be modified, in response to a second instruction executed for that thread, to indicate that the thread no longer has exclusive access to the shared resource. For example, the lock parameter for each thread may indicate how many shared resources are currently locked by that thread. In this case, the processor may permit multiple threads to have exclusive access to different shared resources at a time. When selecting the selected thread, the selector may consider the lock parameters of the threads in order to select a first set of threads (e.g. selecting the threads with the lock parameter indicating the highest number of locked resources), and then among the first set of threads, select a second set of threads based on function call depth, and then select one of the second set of threads as the selected thread based on the thread program counters associated with the threads in the second set of threads. This approach provides improved performance since it is possible for multiple threads to hold locks to different resources at a time so that they can both proceed in parallel with each other.

In other words, the selector may be configured to firstly consider the lock parameter of the threads followed by the function call depth and finally the program counter. By considering the parameters in this order it may be possible to cause an instruction from the most suitable thread to be executed at a particular instant. Note that there may be no need for the selector to perform a selection from the first set or the second set. For example, if only a single thread has the desired lock parameter, then the thread program counter of that thread will be used to set the general program counter. Similarly, if the first set of threads comprises two threads and only one of those two threads has the desired function call depth, then a second set of threads may not be specifically formed and instead the thread program counter of the thread in the first set of threads having the desired function call depth may be set to the general program counter. Phrased differently, although the selector may be configured to perform the three selections previously mentioned, it may not always be necessary for the three selections to be carried out in each and every case.

In another example, the at least one lock parameter may comprise a shared lock parameter shared between the subset of threads, and a lock owner parameter indicating which of the subset of threads has exclusive access to a shared resource. The shared lock parameter may in some cases comprise a lock count indicating how many resources the lock owning thread indicated by the lock owner parameter has exclusive access to. In other cases, the shared lock parameter may comprise a lock flag indicating whether any of the subset of threads currently has exclusive access to a shared resource. With this example, the processor may ensure that only one thread per subset of threads is allowed to have exclusive access to a shared resource at a time. Hence, if one thread has exclusive access to a first shared resource, a second thread is not allowed exclusive access to a second shared resource (even when the second shared resource is different to the first shared resource). This approach provides increased protection against deadlocks which could arise when there are recursive locks where different threads step through locking a series of resources and then release the locks in turn. If it is known that the code to be executed cannot include such recursive locks, then the previous approach in which each thread has a corresponding lock parameter may be preferred to improve performance (and the previous approach still greatly reduces the occurrence of deadlock compared to the prior art). However, if recursive locks are desired, then restricting locks to one thread at a time may provide increased protection against deadlock. In this case, it is not necessary to provide a lock parameter for each thread, since only one thread can hold a lock at a time. Instead, a lock owner parameter thread indicating which thread currently holds a lock, and a lock parameter shared between the subset of threads (e.g. a lock count indicating the number of threads held by the lock owning thread) is enough to track which thread holds a lock so that the selection of the program counter can favour selecting the thread holding the lock over other threads to avoid deadlocks and ensure forward progress. The lock count is useful for ensuring that all locks that have been set by a thread are relinquished again before allowing other threads to hold a lock.

In the second example, if the at least one lock parameter indicates that a thread has exclusive access to one or more shared resources, then the selector may select the lock owning thread indicated by the lock parameter as the selected thread, so that the lock owning thread can make progress so that eventually it will release the lock and another thread can obtain the lock in turn. On the other hand, if no thread holds a lock, then the selection of the selected thread may be based on the function call depth and thread program counters of the threads as in the first example.

In both the examples discussed above, the at least one lock parameter may be incremented in response to the first instruction and decremented in response to the second instruction (whether the lock parameter is shared between the subset of threads or specific to a single thread). The lock parameter may in one example only have two states—a first state indicating that the thread has exclusive access to a shared resource, and a second state indicating that the thread does not have exclusive access to a shared resource. Such a parameter is easy to represent, since it requires only a single bit for each thread. Accordingly, very little space, and therefore energy, is required in order to represent the state of each thread. In other embodiments, the lock parameter may indicate the number of shared resources to which a thread has exclusive access. In other words, the lock parameter may act as a counter, which is incremented when a thread gains exclusive access to a shared resource and decremented when a thread loses exclusive access to shared resource. Such a system provides a better indicator of priority for each thread. In particular, it may be desirable to prioritise a thread that has exclusive access to several shared resources over a thread that has exclusive access to only one shared resource. However, the storing of this additional information requires more space and hence more energy must be devoted for each thread that is to be executed in the system.

The one or more of the subset of threads that are executed by the processor may comprise the threads having one or more thread parameters that match corresponding thread parameters of the selected thread. In one example, the one or more thread parameters may comprise only the thread program counter. Hence, the executed one or more threads may be the threads whose thread program counter identifies the same instruction that is identified by the general program counter. In other words, the data processing apparatus may execute all of those threads whose program counter is the same as the general program counter. Alternatively, the thread parameters may also include one or both of the function call depth parameter or the lock parameter, in addition to the thread program counter, so that instructions are executed for the threads having a combination of thread parameters matching the thread parameters of the selected thread. In this way, a single instruction may be executed for multiple threads simultaneously.

The instructions that are executed by the processor of the data processing apparatus may be micro-operations. In some systems, a complex instruction (e.g. a load/store multiple instruction) may be separated into micro-operations, before those instructions reach the processor. Hence, references to "instruction" in the present application should be interpreted as referring to either instructions or micro-operations corresponding to part of an instruction.

The first instruction and the second instruction may be encoded as a NOOP (no operation) instruction in at least one predefined instruction set. In such cases, the instruction set used by the data processing apparatus is an enhanced version of the predefined instruction set. In other words, the instruction set used by the data processing apparatus may define instructions that are not defined in the predefined instruction set. As a result of the first instruction and the second instruction being encoded as NOOP instructions in at least one predefined instruction set, the first instruction and the second instruction may be disregarded in those predefined instruction sets. Code that is written to operate on the data processing apparatus still functions correctly on a second data processing apparatus implementing the predefined instruction set since the first instruction and the second instruction will simply have no effect on the second data processing apparatus. Consequently, code that is written for the data processing apparatus may be said to be backwards compatible with legacy systems. This means it is not necessary to write different versions of code for different systems, making code development more efficient.

The processor may be configured to perform a further operation in response to at least one of the first and second instructions. For example, the further operation may be one or more of: an operation that is part of a locking sequence for gaining exclusive access to the shared resource, an operation is part of an unlocking sequence for relinquishing exclusive access to the shared resource, an operation for accessing the shared resource, an operation for determining whether the thread had exclusive access to the shared resource, and a compare and exchange operation. This allows the functionality for updating the lock parameter for a thread to be overlaid with another instruction to reduce the number of instructions that need to be executed.

The shared resource may comprise data in a memory. Other examples of the shared resource may be a hardware device, a communications channel, or a critical section of code.

The processor may be configured to issue a memory barrier operation to memory prior to relinquishing exclusive access to the shared resource. The memory system may process transactions in a different order to the order in which the transactions are received from the processor. Memory barrier operations may be issued by the processor to control the extent to which the memory can reorder transactions. The reordering of memory operations by the memory system is prohibited across memory barriers. That is, while the memory is free to process operations between successive memory barrier operations in any order, when a memory barrier operation is received the memory should process all memory operations received before the memory barrier operation before memory operations received after the memory barrier operation. If no memory barrier is issued, then there is a risk that a transaction issued after exclusive access to a resource was relinquished is processed by the memory system while exclusive access was still held, which could lead to incorrect data values. By issuing memory barrier operations prior to relinquishing exclusive access to the shared resource, the system can ensure that the shared resource is accessed by only a single thread at a time and ensure consistency of data in the memory.

FIG. 1 shows a data processing apparatus 100 in accordance with one embodiment. A general program counter 120 is set to one of the program counters 184 associated with a particular thread by the selector 110. The value of the general program counter 120 is then sent to the fetch unit 130 that fetches the instruction referred to by the general program counter 120. The fetched instruction is passed to a decode unit 140 which decodes the instruction and the decoded instruction is sent to issue unit 150. The issue unit 150 issues one or more signals to the processor 160 in order to execute the fetched instruction for one or more of the threads. The processor 160 may be capable of executing an instruction for one or more threads simultaneously or substantially simultaneously. In some embodiments, the processor 160 may have parallel functional units for processing each respective thread so that the same instruction is executed in parallel for multiple threads. Other systems may only have a single functional unit and so the same instruction is processed in sequence for each of the subset of threads before moving onto the next instruction. Other systems may have some parallel units, but fewer than the total number of threads, so that the same instruction is processed for a number of threads in batches of less than the total number of threads.

The processor 160 may also access memory 170, which may comprise a cache as well as a main memory. The processor may also communicate with a register file 180 into which data values may be loaded or stored. In this embodiment, register file 180 comprises a number of different hardware units for each thread. For example, the register file 180 shown in FIG. 1 comprises, for each thread, a set of registers 182, a program counter 184, a function call depth counter 186, and a lock counter 188. It will be appreciated that different hardware configurations to those shown in FIG. 1 may be possible. For example, a single register bank 182 may comprise registers for more than one thread. Furthermore a subset of the hardware components shown may exist outside the register file 180.

In the embodiment described herein, only a single set of threads is considered, with at least a subset of those threads being executed in parallel. However, it will be appreciated that the data processing apparatus 100 is not limited to such a configuration. For example, the data processing apparatus 100 may execute on multiple groups or subsets of threads, with each group of threads being capable of being executed substantially simultaneously. Accordingly, the general program counter 120 may comprise a set of general program counters, each general program counter in the set being related to a different group of threads. The remainder of this description only considers a single group (subset) of threads, but it will be appreciated that the techniques described could be applied to each different thread group when there are multiple thread groups.

FIG. 2 shows a single group of threads T#0 to T#31 executing a sequence of instructions. Since each of the threads has its own registers and since the instructions being executed refer to registers, each of the threads may behave differently when executing the same instructions. Instruction 0 causes the data values held in register 5 and register 3 to be added together and stored in register 0. The instruction on line 1 causes the execution of the thread to jump to 'label' at line 3 if the previous addition was equal to 0. In this case, the result of the addition performed by thread T#2 (0+0) and the result of the addition performed by thread T#4 (−1+1) are both equal to 0 and therefore the flow of control for these two threads jumps to 'label'. Other threads do not jump but instead continue to the instruction at line 2.

Consequently, the program counter for threads T#2 and T#4 is equal to 3 and the program counter for the remaining threads is equal to 2. In order to encourage convergence of the threads, the general program counter 120 for the data processing apparatus 100 will be set to the lowest thread program counter 184 amongst all threads (i.e. 2). By selecting the value of the general program counter 120 in this manner, the threads that are less far advanced can be made to make progress and therefore catch up with the other threads, thereby leading to a convergence of threads. This is a desirable state to be in, because then the parallelism of the system is improved, i.e. more threads will execute in parallel. Accordingly, the general program counter 120 is set to the value 2, which is the lowest program counter value associated with any thread. Since threads T#2 and T#4 do not have a thread program counter equal to 2, the instruction at line 2 is not executed for threads T#2 and T#4. The remaining threads perform the instruction at line 2 which causes the data values at register 0 and register 4 to be multiplied together and stored in register 6. Having performed the multiplication, the thread program counter for each of the threads that executed the instruction is advanced to 3. Accordingly, all threads have the same program counter and convergence is achieved. The "instruction" at line 3 is merely a label and so execution proceeds to line 4. This instruction causes the memory address that is stored in register 9 to be accessed from main memory and for the data value at that address to be stored at register 8. As in shown in FIG. 2, since each of the threads stores a different memory address value in register 9 (e.g. thread T#0 stores the memory address 100, whilst the thread T#5 stores the memory address 200), each of threads will access a different memory address and therefore store a different value in their respective register 8. It is possible to coalesce the memory accesses which target a same cache line or a same page of memory into a single memory access, to save power and time.

Figure 3:
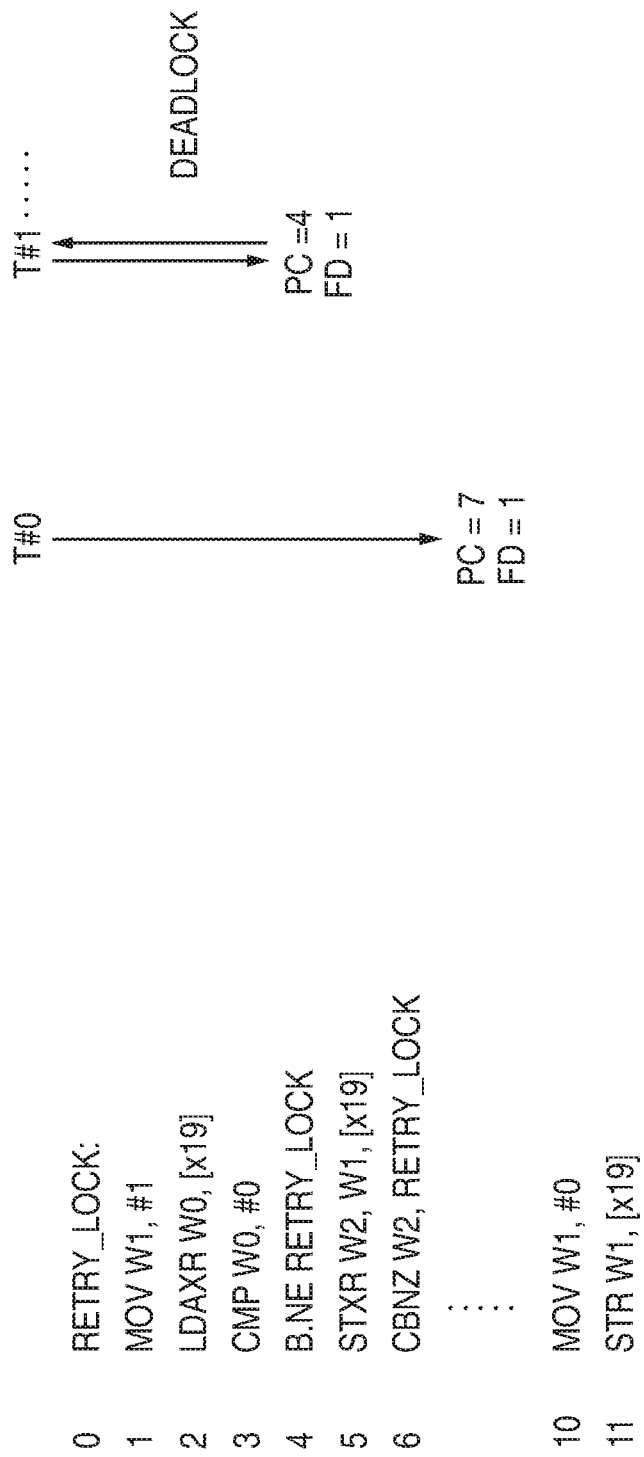
FIG. 3 shows code in which deadlocking may occur in a SIMT system.

FIG. 3 shows code being executed on two threads, with the code comprising a shared resource, access to which is controlled via a lock. Here, the shared resource is accessed by a critical section of code between lines 7 and 9. The shared resource may be anything which is required by the critical section of code and for which exclusive access to the resource is needed by one thread at a time. For example, the resource may be a shared data structure or the use of a hardware unit or device. Alternatively, the critical section of code may itself be regarded as the shared resource. In this example, the selector 110 is configured to set the general program counter 120 to the thread program counter 184 of the thread having the highest function call depth counter 186. Where multiple threads have the highest function call depth counter 186, the general program counter 120 is set to the lowest program counter 184 from among the threads having the highest function all depth counter 186. As previously discussed, it is desirable, under normal circumstances, to allow threads with the lowest program counter to execute in preference to threads with a higher program counter value in order to cause convergence of threads to occur. However, as will be shown, this mechanism of program counter selection causes deadlock to occur when there is a critical section of code.

Several instructions of FIG. 3 refer to an address in register x19. This address may correspond to a data value indicating whether or not the shared resource is locked for exclusive access by a thread. In this example, when the value at the address referenced by register x19 is 0, then this indicates that no lock has been set for the resource used by the critical section of code at lines 7-9, and when the value at this address is 1 then a lock has been set. However, it will be appreciated that there are other ways of representing whether exclusive access has been granted for a resource. Note that when the threads execute this code example, different threads executing the instructions at lines 2 and 5 may access different versions of register x19 in their respective register sets 182, which may contain different memory addresses. Hence, the shared resources which the threads seek to access may differ between threads. On the other hand, if there are multiple threads for which register x19 contains the same address, then there is a potential conflict as discussed below.

At first, all threads will execute in lockstep. Line 0 comprises a label and therefore has no effect on the execution. Line 1 causes the data value 1 to be stored in register w1. The instruction at line 2 is known as a load exclusive instruction. This causes a data value to be accessed and a monitor to be set. The monitor detects whether the data value is modified. In this example, therefore, the data value stored in the memory address referred to in register x19 is accessed, stored in register w0, and a monitor for that memory address is set. At line 3, the data value stored in register w0 is compared to the number 0. In other words, aside from setting the monitor, lines 2 and 3 collectively determine whether or not the data values stored in the memory address referred to in register x19 is equal to 0. The instruction at line 4 causes execution to jump to the label retry_lock at line 0 if the data values are not equal. In other words, if the data value stored in register w0 is not equal to 0 (i.e. another thread already has the lock on the shared resource), then the flow of control returns to the label retry_lock, otherwise, the flow of control continues to line 5. Hence, the instructions at lines 2 to 4 check whether another thread already had the lock by the time the load instruction at line 2 was executed.

On the other hand, the instructions at lines 5 to 6 check whether another thread has gained the lock at some point after executing the exclusive load instruction at line 2, but before starting the critical section of code. This ensures that multiple threads cannot gain the lock simultaneously. Line 5 is a store exclusive instruction, which causes a data value to be stored only if a previously set monitor indicates that the memory address being watched has not been modified. In this example, the instruction causes the data value stored in register w1 (i.e. 1) to be stored in the memory location referred to by register x19 only if the data value stored in the memory address referred to by register x19 has not been modified since the monitor was established by the load exclusive instruction on line 2. The result of when the store was successful or not is then stored at register w2. In particular, if the store was successful then the value 0 is stored in w2. Otherwise, if the store was unsuccessful, a non-zero value is stored in w2. Of course, it will be appreciated by the skilled person that the specific number used to indicate success or failure is unimportant and that these numbers could easily be inverted. Since the store operation is only carried out if another thread has not modified the data value stored in the address referred to by register x19, if the value of register x19 is the same for all threads then exactly one thread will modify the data value. If different threads require different locked resources then different addresses may be placed in register x19 for different threads, so that it is possible for more than one thread to successfully execute the store instruction at line 5. The outcome of the store exclusive instruction for each thread is therefore indicative of whether or not that thread has acquired the lock. At line 6, a comparison is made to determine whether or not the data value stored in register w2 is 0 (i.e. whether or not the store exclusive instruction was unsuccessful). The flow of control returns to label retry_lock on line 0 if the data value stored at w2 is not 0. Otherwise, flow continues onto line 7.

Lines 7 to 9 (not shown in FIG. 3) represent the critical section. That is, by virtue of the previous locking sequence, the critical section can only be executed by a single thread per shared resource at a time (multiple threads may execute the critical section if they are using different resources). A thread must finish executing code in the critical section before another thread requiring the same resource can enter. The critical section may include any instructions which make use of the shared resource, such as load/store instructions accessing a shared location or shared data structure for which exclusive access is required to maintain data consistency, or instructions which make use of a hardware device which can only be used by one thread at a time.

An unlocking sequence is shown, starting at line 10. This code is executed after the critical section has been executed. At line 10, the data value 0 is stored in register w1. At line 11, the data value stored in register w1 (i.e. 0) is stored in the memory location referred to in register x19, to indicate that this thread no longer has the lock. This means that another thread reaching the instructions at lines 2 to 4 can now successfully acquire the lock.

As previously mentioned, this code for providing a lock to a critical section may cause a deadlock to occur in a SIMT data processing apparatus if multiple threads are trying to obtain the same lock (i.e. the same memory locations are indicated in the respective versions of register x19 in the register banks 182 for different threads). For example, as shown in FIG. 3, thread T#0 may be the thread that acquires access to the lock and therefore continues to line 7 of the code. However, thread T#1 (and other threads targeting the same resource) will fail to acquire the lock. Accordingly, in a first execution of the code, threads other than thread T#0 will execute up to line 6 of the code before their failure to obtain the lock causes their flow of control to return to line 0. For subsequent attempts, threads other than thread T#0 may execute up to line 4 because thread T#0 will now have stored the value #1 to the address referred to in register x19. All of the threads have the same function call depth counter value of 1. Therefore, the selector 110 will set the general program counter 120 to lowest thread program counter 184 associated with each of the threads. All the threads other than thread T#0 have a program counter value of 0 and so the general program counter value 120 will be set to 0. Accordingly, threads other than thread T#0 will be allowed to execute. However, those threads will still fail to acquire the lock to the critical section, because the lock is held by T#0. At line 4, the flow of control for those threads will therefore pass to line 0. Again, when the selection of program counter value is made by the selector 110 threads other than thread T#0 have a program counter value (0) that is lower than that of thread T#0 (7). Accordingly, the general program counter value 120 will be set to 0 and threads other than thread T#0 will be allowed to execute. This process will continue, possibly forever. Only thread T#0 is able to unlock access to the critical section and thread T#0 can only unlock access to the critical section after the critical section has been executed. However, thread T#0 is not able to execute the critical section because its program counter value is higher than that of other threads and so the general program counter 120 will never be set to the thread program counter 184 associated with thread T#0. In this example, therefore, a deadlock occurs. No thread can make any progress and so the system halts.

Figure 4:
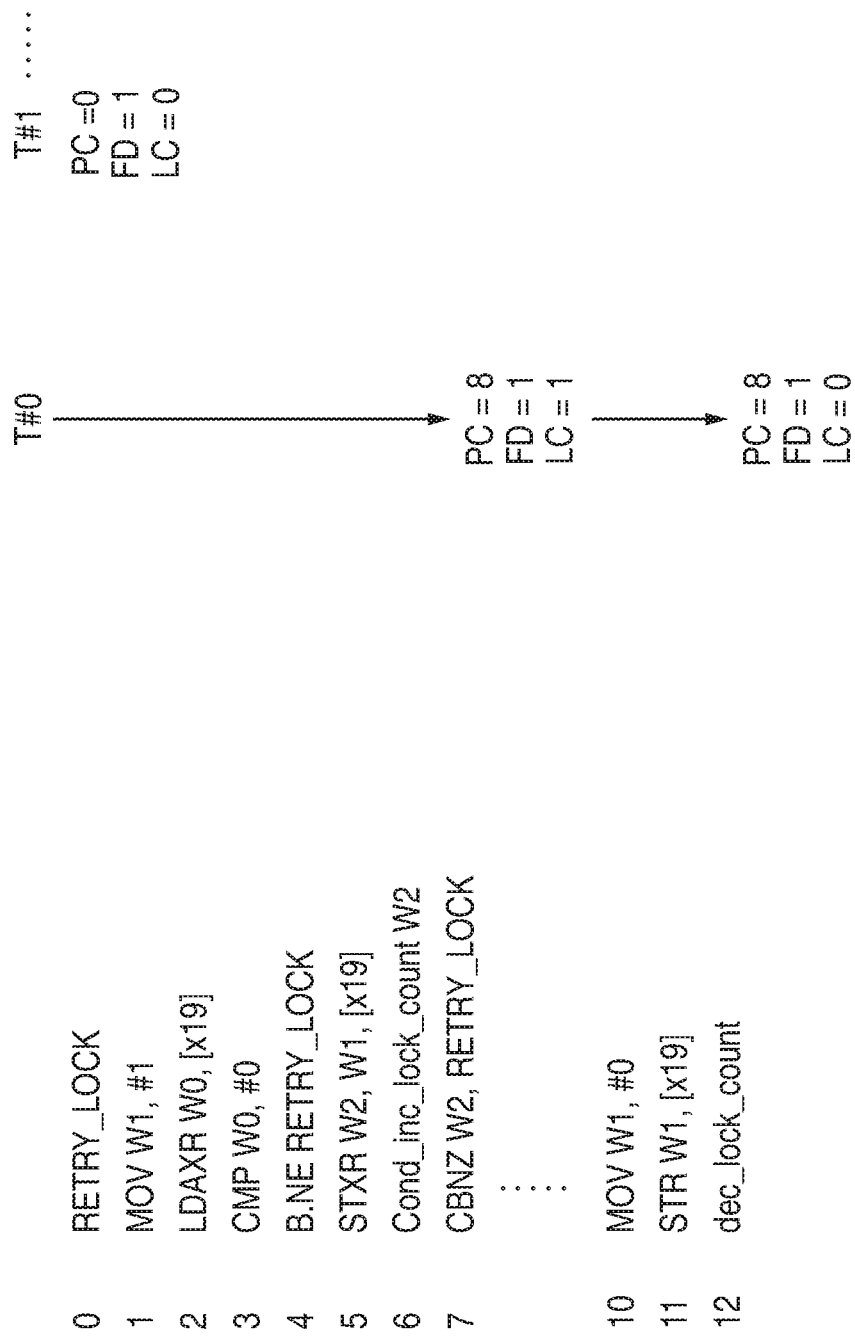
FIG. 4 shows a second code example which explains how the deadlock of FIG. 3 may be prevented.

FIG. 4 shows a solution to this deadlock problem. In this embodiment, a lock counter 188 is provided for each thread and the selector 110 is configured to select the selected thread (whose thread program counter is set to the general program counter) based on the lock counter in addition to the function call depth and thread program counter. The general program counter 120 is set to the thread program counter 184 associated with the thread having the highest lock counter 188. If multiple threads have the highest lock counter 188 then the threads having the highest function call depth counter 186 are considered from among the threads having the highest lock counter 188. If multiple threads have the highest lock counter 188 and the highest function call depth counter 186 then the thread having the lowest program counter value from amongst those threads is selected. The general program counter is then updated based on the thread program counter of the selected threads, and then the instruction indicated by the general program counter can be executed for any threads with matching thread parameters (at least a matching thread program counter, and optionally also matching function call depth and lock parameter). It will be appreciated that other embodiments may apply a different mechanism where a specific thread program counter or specific combination of thread program counter, function call parameter and lock parameter is selected directly (rather than selecting a thread).

The code of FIG. 4 is the same as that of FIG. 3 with the addition of two new instructions at lines 6 and 12 respectively. These instructions cause the conditional increment and the decrement of the lock counter 188 associated with a thread. In particular, the instruction 'cond_inc_lock_count w2' on line 6 causes the lock counter 188 associated with a thread to be incremented if the value of w2 is zero. As explained with reference to FIG. 3, the value of w2 is set to either 0 or 1 with the value 0 representing success of the STXR instruction (i.e. that the thread has succeeded in acquiring the lock) and 1 representing failure of the STXR instruction (i.e. that the thread has failed to acquire the lock). Accordingly, the instruction on line 6 causes the lock counter 188 for a particular thread to be incremented if that thread has managed to acquire the lock in the proceeding instruction on line 5. The instruction 'dec_lock_count' at line 12 decrements the lock counter 188 for a particular thread. This instruction is unconditional. That is because the code at lines 8 to 12 is only executed by a single thread at a time—specifically the thread that currently holds the lock and therefore has access to the critical section. Consequently, there is no ambiguity with regards to which thread's lock counter should be decremented.

When the code executes, as a result of the instruction at line 6, the thread that acquires the lock (T#0) has its lock counter incremented. Conversely, other threads do not increment their lock counters, because their value of register w2 will be non-zero (having failed to acquire the lock). At line 7, thread T#0 will continue onto line 8 whilst the remaining threads will return to label 'retry_lock' at line 0. As previously explained, in this embodiment the selector 110 is configured to set the general program counter 120 to the program counter of thread having the highest lock counter. Accordingly, when the program counter of thread T#0 is 8, that thread will be able to continue executing by virtue of its higher lock counter 188, even though its program counter 182 is higher than that of the other threads. Thread T#0 is therefore able to continue execution and will eventually execute the code of the unlocking sequence on lines 10 to 11, which releases the lock. Thread T#0 then continues to line 12 where its lock counter is decremented. At this point, the lock counter of each of the threads is equal to 0, the function call depth of each of the threads is equal to 1 and so the general program counter 120 is set to the lowest thread program counter 184 among all threads. Accordingly, threads other than thread T#0 are permitted to run and they execute the code between lines 0 and 7. During this execution, one of the threads will acquire the lock and have its lock counter 188 incremented as previously described. This sequence will repeat until all threads have passed the critical section of code. Accordingly, a deadlock situation is avoided despite the presence of a critical section of code.

In this example of FIG. 4, the cond_inc_lock_count and dec_lock_count instructions only affect the lock counter 188 associated with a particular thread. However, it will be appreciated that these instructions may perform additional operations. For example, the conditional increment instruction could be combined with either the exclusive store instruction on line 5 or the comparing branch instruction on lines 7. In such cases, the conditional increment instruction is carried out before or in parallel with operations relating to the compare and branch instruction and after operations relating to the exclusive store instruction. Similarly, the decrement lock counter instruction may be combined with other operations. For example, the decrement lock counter instruction may be combined with the instruction that stores the numerical value 0 in the address pointed to by register x19.

There are also numerous ways of implementing the locking sequence. In the example of FIG. 4, a combination of a load exclusive instruction on line 2 and a store exclusive instruction on line 5 are used. Another way of implementing the locking mechanism may be through the use of a compare and exchange instruction (CMPXCHG). The compare and exchange instruction is an atomic primitive. In other words, the instruction cannot be interrupted mid-execution but instead runs to completion once it has started. A compare and exchange instruction takes three parameters. One of the parameters is a location in memory. A further parameter is a comparison value and a still further parameter is the store value. The compare and exchange instruction tests whether or not the data value at the location in memory is equal to the comparison value and if so, writes the store value into the memory location and returns a result indicating that the operation was successful. If the data value at the memory location is not equal to the comparison value, nothing is written to the memory location (the memory location retains its original value) and the result instead indicates that the operation was unsuccessful. Again, such a compare and exchange instruction may be combined with other operations and may be combined with the cond_inc_lock_count instruction.

A memory barrier operation may be performed before the dec_lock_count instruction and after the critical section in the code. In a data processing apparatus, memory access instructions may be reordered for efficiency. However, such reordering may not occur across a memory barrier. Hence, a memory barrier can help to ensure that memory access operations that are part of a critical section of code are processed ahead of memory access operations which were issued after the critical section has completed.

The cond_inc_lock_count instruction and the dec_lock_count instruction may each be encoded such that in a predetermined instruction set, the encoding of the cond_inc_lock_count instruction and dec_lock_count instruction corresponds to a NOOP instruction. For example, the instruction set used by the data processing apparatus 100 may be an enhanced version of an instruction set that encodes these two instructions as NOOP instructions. Consequently, on a data processing apparatus other than data processing apparatus 100, the two instructions may have no effect. Accordingly, code that is designed for use with data processing apparatus 100 may be backwards compatible with other data processing apparatuses and may be backwards compatible with a data processing apparatus that does not use SIMT.

Figure 5:
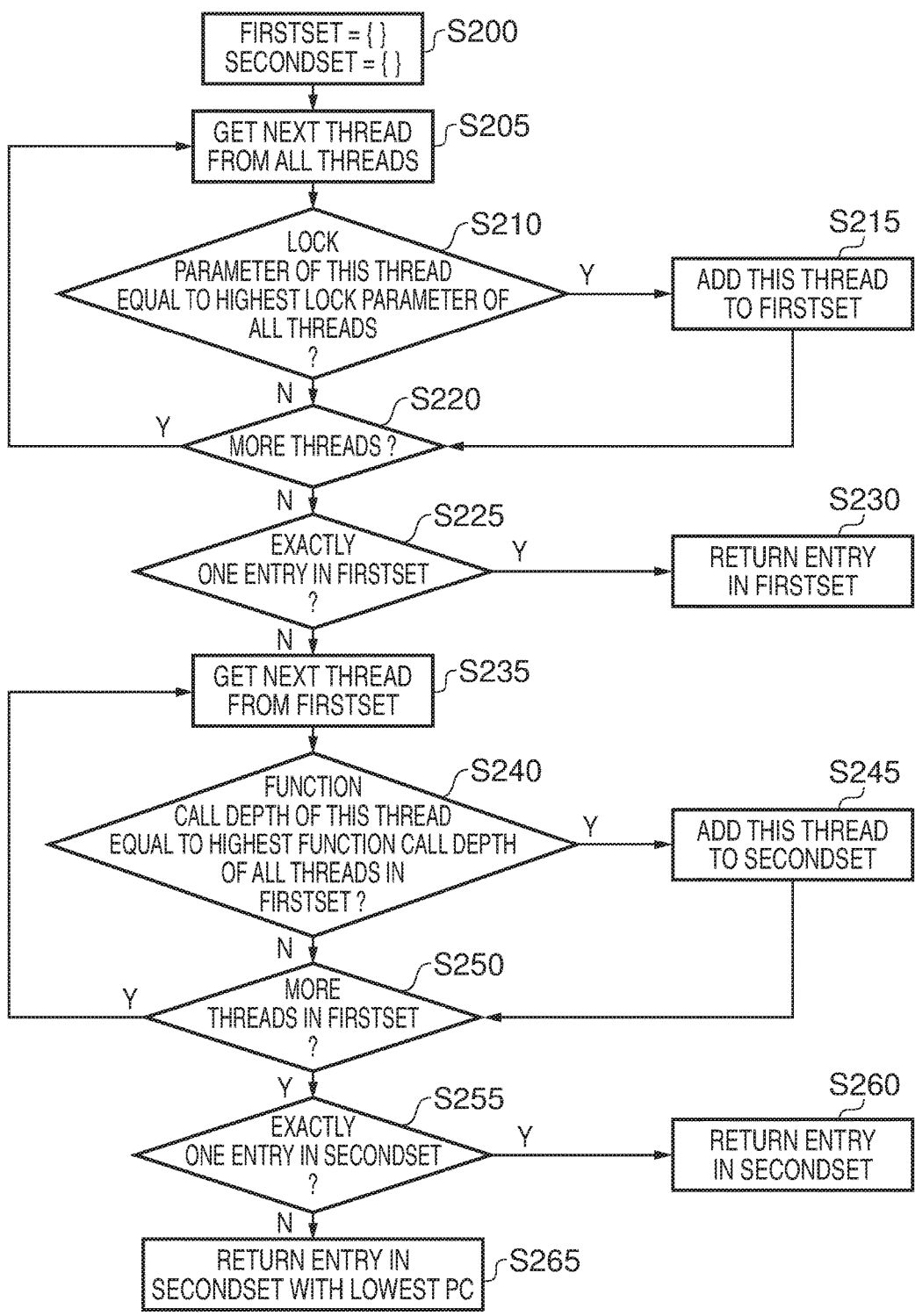
FIG. 5 shows, in flow chart form, how selection may occur between the threads of a SIMT system.

FIG. 5 illustrates a method of selecting the selected thread, whose thread program counter is used as the general program counter 120. The method begins at step s200 in which the first set and the second set are both set to the empty set. At step s205, the next thread out of all the threads is selected. This step together with steps s210, s215, and s220 collectively form a loop that iterates through all threads. At step s210 it is determined whether or not the lock parameter (i.e. lock counter 188) of the thread selected in step s205 is equal to the highest lock parameter of all threads. If the lock parameter of this thread is equal to the highest lock parameter of all threads then flow proceeds to step s215, otherwise flow continues to step s220. It is assumed in step s210 that the data processing apparatus is aware of the highest lock parameter of all the threads. If this information is not readily available, it can be determined by firstly iterating through all threads, or by keeping a running count of the highest lock parameter seen from previous threads and discarding threads already added to the first set when a lock parameter higher than the previous highest lock parameter is encountered. At step s215, the selected thread is added to the first set and flow then proceeds to step s220. At step s220, it is determined whether or not there are more threads to iterate through. If there are more threads, then flow returns to step s205 where the next thread is selected. If there are not more threads then flow continues to step s225. Hence, by the end of step s220 a first set of threads is determined which comprises the threads having a lock parameter equal to the higher lock parameter of any of the threads. Step s225 determines whether or not there is exactly one entry in the first set. If there is exactly one entry in the first set then flow continues to step s230 where the entry in the first set is returned as the selected thread. That is, the general program counter 120 is set to the thread program counter 184 associated with the only thread in the first set. If, at step s225, there is not exactly one entry in the first set, then flow continues to step s235. Collectively, steps s205 to s230 attempt to base the decision of thread program counter selection on the lock count parameter of all of the threads. If one of the threads has a higher lock counter parameter than all of the other threads, then that thread is the selected thread and the general program counter 120 is set to the thread program counter 184 corresponding with the thread having the higher lock counter parameter 188. Otherwise, a further narrowing of the threads is carried out as explained below.

At step s235 the next thread from the first set is selected. Steps s235 to s250 collectively form a loop that iterates through all threads in the first set. At step s240 it is determined whether the function call depth of the selected thread is equal to the highest function call depth of all threads in the first set. Again, it is assumed that it is possible to determine the highest function call depth of all threads in the first set. One way this information may be determined is to firstly iterate through all threads in the first set, or by maintaining a running count value as discussed above. If, at step s240, the function call depth of the selected thread is equal to the highest function call depth of all threads in the first set, then the flow continues to step s245. Otherwise, flow continues to step s250. At step s245, the selected thread is added to the second set and flow continues to step s250. At step s250, it is determined whether or not there are more threads in the first set to be iterated through. If there are more threads in the first set, then, flow returns to step s235 to continue the loop. Otherwise, flow continues to step s255 where it is determined whether or not there is exactly one entry in the second set. If there is exactly one entry in the second set at step s255, then flow continues to step s260. At step s260 the single entry in the second set is returned as the selected thread. In other words, the general program counter 120 is set to the thread program counter 184 associated with the single thread in the second set. Such a situation may arise, for example, if more than one thread shares the highest lock counter parameter 188 but if only one of those threads has the highest function call depth counter 186. Accordingly, such a thread is allowed to execute by setting the general program counter 120 to the thread program counter 184 associated with that thread. Collectively, steps s235 to s260 relate to a second criterion that is used to determine the general program counter 120.

If there is not exactly one entry in the second set, then flow proceeds to step s265 where the entry in the second set with the lowest program counter 184 is returned as the selected thread. In other words, the general program counter 120 is set to the lowest of the thread program counters 184 amongst all the threads in the second set. Step s265 therefore provides the third criterion to determine the general program counter 120.

Figure 6:
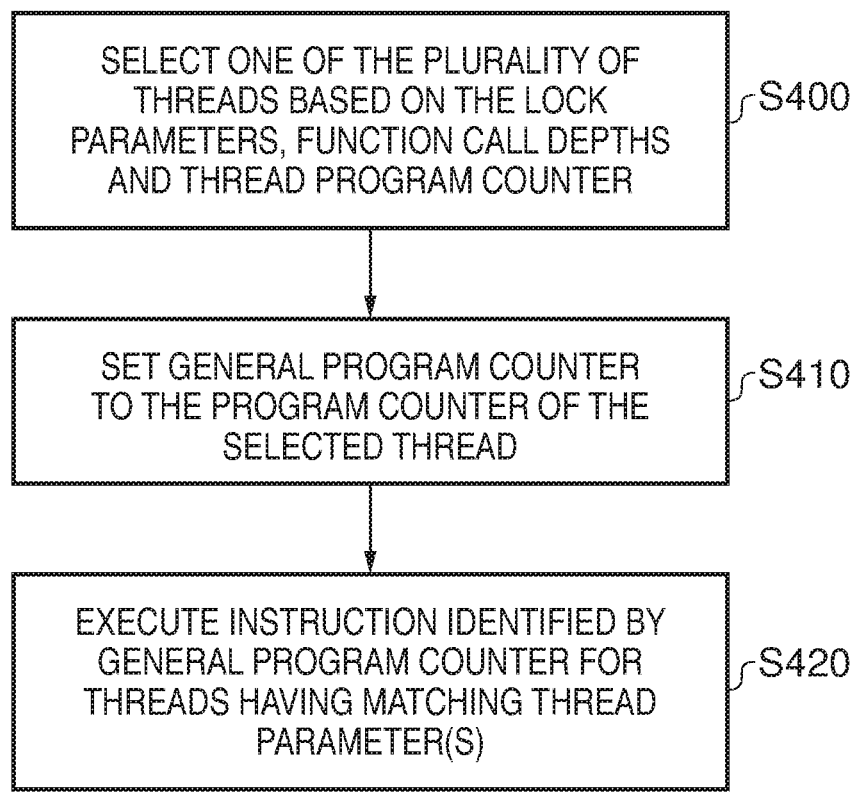
FIG. 6 shows, in flow chart form, a method of executing threads.

FIG. 6 shows how the threads to be executed in each cycle are selected. At step s400 one of the plurality of threads (or equivalently, one of the thread program counters corresponding to the threads) is selected based on the lock parameters (lock counters) 188, functional call depth counters 186 and thread program counters 184. An example of this process is shown with respect to FIG. 5. At step s410 the general program counter 120 is set to the thread program counter of the selected thread. In other words, the general program counter 120 is set to match the thread program counter 184 corresponding with the thread selected in step s400. Finally, at step s420, the instruction that is identified by the general program counter 120 is executed for all threads whose associated thread parameters match the thread parameters of the selected thread (the thread parameters may comprise only the thread program counter 184, or may comprise a combination of the thread program counter with one or both of the lock counter 188 and function call depth 186). This process may cause the thread program counter 184 associated with each thread to change and accordingly the process may then be repeated starting from step s400, causing a different general program counter value 120 to be determined.

In the example discussed with respect to FIG. 4, the processor optimistically tries to acquire locks for all the threads in the warp and then sorts out execution preference order based on which threads were able to acquire locks.

Figure 9:
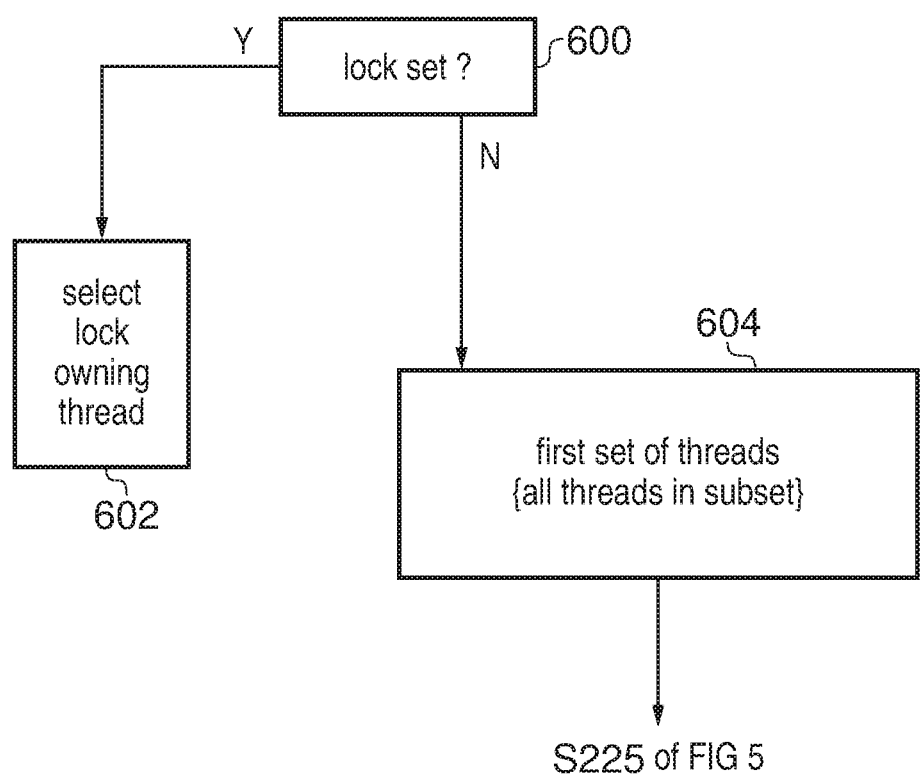
FIG. 9 is a flow chart showing a method of selecting a thread program counter using the state data of FIG. 7.

A second embodiment is described with respect to FIGS. 7 to 9. In this embodiment, only one thread in the group is allowed to hold a lock at a time. Also, whereas in FIG. 4 the processor optimistically attempts to acquire locks for all threads using the locking sequence including the STXR instruction, and then only if successful increments the lock count to signal that the thread gained the locking privilege, in FIGS. 7 to 9 the order is flipped so that first an instruction is executed to request the locking privilege and update the lock parameter accordingly. At this point, the processor ensures that only one thread can successfully execute the instruction requesting the locking privilege (for the other threads, execution of this instruction fails and so the thread program counter for that thread is not incremented). Having obtained the locking privilege, the thread that was successful then executes the locking sequence to acquire the lock. In this way, only one thread in the group is allowed to hold locks at any point in time. The unlocking sequence is still the same as in FIG. 4—first release the lock, then release the locking privilege. Locks can be requested multiple times in a single thread while holding the lock privilege, and the number of locks held by the thread can be tracked using a lock counter. While it is possible to implement the second embodiment in the same way as the first embodiment with a lock counter per thread and a program counter selection mechanism that preferences higher lock counts, because the locking privilege (execution preference) is given to a single thread per group at a time, it is possible to simplify this scheme by simply storing for the group as a whole a single indication of whether any thread in the group has the locking privilege, the identity of this thread, and a single lock counter for the group.

Hence, FIG. 7 shows an example of a register file 180 and state data for use with this second embodiment. FIG. 7 differs from the register file of FIG. 1 in that the lock counter 188 is not provided for each thread. Instead, in addition to the general program counter 120 for the group of threads, a number of lock parameters are shared between the group of threads:

- a lock set flag 500 indicating whether any thread in the group has locked for one or more shared resources;
- a lock owner parameter 502 indicating which thread of the group has locked one or more shared resources; and
- a lock count parameter 504 indicating how many resources have been locked by the lock owning thread indicated by the lock owner parameter 502.

In some examples, the lock set flag 500 may be omitted and instead the lock owner parameter 502 or lock count parameter 504 could be used to signal whether a thread holds a lock. For example, if the lock count parameter 504 is zero, then this may signal that no thread holds a lock, and if the lock count parameter 504 has a non-zero value, then this may signal that a thread holds a lock. Alternatively, the lock owner parameter 502 may have a value corresponding to one of the threads if that thread holds a lock, and have a value that does not correspond to any of the threads if no thread holds a lock, so this may effectively indicate whether any lock has been set. However, sometimes providing a separate lock set flag 500 which indicates whether or not any lock has been set can be useful, for example because the lock set flag 500 may comprise a single bit which is quicker and more energy-efficient to check than multi-bit values corresponding to the lock owner parameter 502 or lock count value 504.

FIG. 8 shows a code example for the second embodiment, as follows:

line 0: a label representing the start of the locking sequence, which does not cause any specific action at the processor
line 1: inc_lock_count is an instruction to request the locking privilege (the right for a thread to set one or more locks for resources). This instruction can only be successfully executed for one thread in the group. Hence, following this instruction one thread can proceed to the next instruction (with that thread's program counter being incremented to the next instruction), while the other threads fail this instruction (and so their thread program counters remain at the same instruction inc_lock_count until they can successfully execute it). If inc_lock_count is successfully executed, set the lock set flag 500 to indicate that a thread holds the locking privilege, set the lock owner parameter 502 to indicate the identifier of the current thread, and increment the lock count 504.
line 2: a label retry_lock for branching to if the thread with the locking privilege was unable to obtain the lock
lines 3-5: the same as lines 1-3 of FIG. 4, for checking whether another process (e.g. a thread outside the current group of threads, or a process executing on a different processor in a multi-processor system, for example) has already obtained the lock for the resource identified by the address in register x19.
line 6: a conditional branch for branching to the "back off" sequence at lines 10-12 in the event that another process holds the lock for the address identified in x19.
lines 7-8: the same as lines 5 and 7 of FIG. 4. A store exclusive instruction to set the lock for the address in register x19, and a conditional branch to branch back to line 2 if the store exclusive instruction fails. Unlike in line 6 of FIG. 4, there is no conditional instruction to increment the lock count if the lock is successfully acquired, because in FIG. 8 the lock count has already been incremented at line 1.
line 9: if the lock is successfully acquired, branch to line 13 to do something using the locked resource.
line 10: a label "backoff_lock" representing the start of the backoff sequence for relinquishing the locking privilege if the lock for resource identified by the address in register x19 was already set. By relinquishing the locking privilege, another thread which may have a different address in its version of register x19 may be able to successfully obtain its lock, and make progress.
line 11: decrement the lock count 504. If this results in the lock count 504 becoming zero, also clear the lock set flag 500, so that another thread can obtain the locking privilege. After line 11, the thread can wait some time to allow time for the other thread in the same group to finish its processing using the lock and release the lock.
line 12: branch back to the start of the locking sequence at line 0 to try obtaining the lock again.
line 13: a label "lock_acquired" representing the start of the sequence executed if the lock is successfully acquired. Following this, any number of instructions may be executed using the locked resource.
line 14: once the processing using the locked resource is complete, then start an unlocking sequence
lines 15-17: the same as lines 10-12 of FIG. 4 to relinquish the lock, except that in this case if the dec_lock_count instruction is executed and this results in the lock count 504 becoming zero, then the lock set flag 500 is cleared.

Hence, with this example only one thread within the same group of threads may hold a lock at a time, to provide added protection against deadlock.

FIG. 9 shows a method of selecting the selected thread (and hence which thread program counter to set to the general program counter for the group of threads) when using the second embodiment. Since only one thread within the group can hold locks at a time, the initial part of the program counter selection process becomes simpler. At step 600, the selector 110 determines whether the lock set flag 500 indicates whether any thread within the group holds a lock. If so, then at step 602 the selector 110 selects the thread indicated by the lock owner parameter 502 as the selected thread.

On the other hand, if the lock set flag 500 indicates that no thread in the group currently holds a lock, then at step 604 all threads of the group (subset) are considered to be part of the "first set" of threads. The method then proceeds to step S225 of FIG. 5, and after that the method then proceeds in the same way as in FIG. 5 to select a selected thread based on the function call depth and thread program counter.

Having selected the selected thread, steps S410 and S420 of FIG. 6 can be applied as before.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus configured to execute a plurality of threads, the data processing apparatus comprising:
a general program counter to identify one instruction in a stream of instructions to be executed for at least a subset of the plurality of threads, wherein each thread in the subset has an associated thread program counter to identify one instruction in the stream of instructions,
selector circuitry configured to select a selected thread of the subset of threads and to set the general program counter to the thread program counter associated with the selected thread; and
a processor configured to execute an instruction identified by the general program counter for one or more of the subset of threads including the selected thread,
wherein the subset of threads is associated with at least one lock parameter for tracking which of the subset of threads has exclusive access to a shared resource;
wherein the processor is configured to modify the at least one lock parameter to indicate that a thread has gained exclusive access to the shared resource in response to a first instruction executed for that thread, and to modify the at least one lock parameter associated with the thread to indicate that the thread no longer has exclusive access to the shared resource in response to a second instruction executed for that thread; and
wherein the selector circuitry is configured to select the selected thread based on the at least one lock parameter.

2. A data processing apparatus according to claim 1, wherein the processor is configured to grant a thread exclusive access to the shared resource in response to a locking sequence comprising at least one locking instruction executed for that thread.

3. A data processing apparatus according to claim 2, wherein the locking sequence does not comprise the first instruction.

4. A data processing apparatus according to claim 1, wherein the processor is configured to relinquish exclusive access to the shared resource for a thread in response to an unlocking sequence comprising at least one unlocking instruction executed for that thread.

5. A data processing apparatus according to claim 4, wherein the unlocking sequence does not comprise the second instruction.

6. A data processing apparatus according to claim 1, wherein the selector circuitry is configured to select, as said selected thread, a first thread indicated by the at least one lock parameter as having exclusive access to the shared resource in preference to a second thread indicated by the at least one lock parameter as not having exclusive access to the shared resource.

7. A data processing apparatus according to claim 1, wherein the selector circuitry is configured to select said selected thread based on a function call depth parameter associated with each thread of the subset of threads.

8. A data processing apparatus according to claim 1, wherein the selector circuitry is configured to select said selected thread based on the thread program counter associated with each thread of the subset of threads.

9. A data processing apparatus according to claim 1, wherein each thread of the subset has a corresponding lock parameter, and the processor is configured to modify the lock parameter corresponding to a thread to indicate that the thread has gained exclusive access to the shared resource in response to a first instruction executed for that thread, and to modify the lock parameter corresponding to the thread to indicate that the thread no longer has exclusive access to the shared resource in response to a second instruction executed for that thread.

10. A data processing apparatus according to claim 9, wherein the processor is configured to permit a first thread to have exclusive access to a first shared resource while a second thread has exclusive access to a second shared resource.

11. A data processing apparatus according to claim 9, wherein the selector circuitry is configured to select a first set of threads based on the corresponding lock parameter of each thread of the subset of threads;
wherein the selector circuitry is configured to select, from among the first set of threads, a second set of threads based on a function call depth parameter;
wherein the selector circuitry is configured to select said selected thread from among said second set of threads, based on the thread program counters associated with the threads in the second set of threads.

12. A data processing apparatus according to claim 1, wherein the at least one lock parameter comprises a shared lock parameter shared between the subset of threads and a lock owner parameter indicating which of the subset of threads has exclusive access to a shared resource.

13. A data processing apparatus according to claim 12, wherein the shared lock parameter comprises a lock flag indicating whether any of the subset of threads have exclusive access to a shared resource.

14. A data processing apparatus according to claim 12, wherein the shared lock parameter comprises a lock count indicating a number of resources to which the thread indicated by the lock owner parameter has exclusive access.

15. A data processing apparatus according to claim 12, wherein if a first thread has exclusive access to a first shared resource, the processor is configured to prevent a second thread having exclusive access to a second shared resource.

16. A data processing apparatus according to claim 12, wherein if the at least one lock parameter indicates that a thread has exclusive access to a shared resource, then the selector is configured to select the thread indicated by the lock owner parameter as said selected thread; and
if the at least one lock parameter indicates that no thread has exclusive access to a shared resource, then the selector is configured to select, from among the subset of threads, a further subset of threads based on a function call depth parameter, and to select said selected thread from among said further subset of threads based on the thread program counters associated with the threads in said further subset of threads.

17. A data processing apparatus according to claim 1,
wherein the processor is configured to increment the at least one lock parameter in response to the first instruction; and
wherein the processor is configured to decrement the at least one lock parameter in response to the second instruction.

18. A data processing apparatus according to claim 17, wherein the at least one lock parameter indicates the number of shared resources to which a thread has exclusive access.

19. A data processing apparatus according to claim 1, wherein the one or more of the subset of threads comprise the threads having one or more associated thread parameters that match corresponding thread parameters of said selected thread, the one or more associated thread parameters including at least the thread program counter.

20. A data processing apparatus according to claim 1, wherein the stream of instructions comprises micro-operations.

21. A data processing apparatus according to claim 1, wherein the first instruction and the second instruction are encoded as a NOOP instruction in at least one predefined instruction set.

22. A data processing apparatus according to claim 1, wherein the processor is configured to perform a further operation in response to at least one of the first and second instructions.

23. A data processing apparatus according to claim 22, wherein the further operation is one or more of: an operation that is part of a locking sequence for gaining exclusive access to the shared resource, an operation that is part of an unlocking sequence for relinquishing exclusive access to the shared resource, an operation for accessing the shared resource, an operation for determining whether the thread has exclusive access to the shared resource, and a compare and exchange operation.

24. A data processing apparatus according to claim 1, wherein the shared resource comprises data in a memory.

25. A data processing apparatus according to claim 24, wherein the processor is configured to issue a memory barrier operation to the memory prior to relinquishing exclusive access to the shared resource.

26. A data processing method for executing a stream of instructions for a subset of a plurality of threads, wherein each thread in the subset has an associated thread program counter for identifying one instruction in the stream of instructions, the data processing method comprising the steps:

selecting a selected thread of the subset of threads, and setting a general program counter to the thread program counter associated with the selected thread, wherein the general program counter identifies one instruction in a stream of instructions to be executed for the subset of threads; and executing an instruction identified by the general program counter for one or more of the subset of threads including the selected thread, wherein the subset of threads is associated with at least one lock parameter for tracking which of the subset of threads has exclusive access to a shared resource;

wherein the at least one lock parameter is modified to indicate that a thread has gained exclusive access to the shared resource in response to a first instruction executed for that thread, and is modified to indicate that the thread no longer has exclusive access to the shared resource in response to a second instruction executed for that thread; and wherein the selected thread is selected based on the at least one lock parameter.

27. A data processing apparatus configured to execute a plurality of threads, the data processing apparatus comprising:

a general program counter means for identifying one instruction in a stream of instructions to be executed for at least a subset of the plurality of threads, wherein each thread in the subset has an associated thread program counter means for identifying one instruction in the stream of instructions, a selection means for selecting a selected thread of the subset of threads and for setting the general program counter means to the thread program counter means associated with the selected thread; and a processor means for executing an instruction identified by the general program counter means for one or more of the subset of threads including the selected thread, wherein the subset of threads is associated with at least one lock parameter for tracking which of the subset of threads has exclusive access to a shared resource;

wherein the processor means is for modifying the at least one lock parameter to indicate that a thread has gained exclusive access to the shared resource in response to a first instruction executed for that thread, and for modifying the at least one lock parameter to indicate that the thread no longer has exclusive access to the shared resource in response to a second instruction executed for that thread; and wherein the selection means is for selecting the selected thread based on the at least one lock parameter.

* * * * *